(12) United States Patent
Segev et al.

(10) Patent No.: US 9,907,042 B2
(45) Date of Patent: Feb. 27, 2018

(54) APPARATUS, SYSTEM AND METHOD OF DETERMINING A TIME SYNCHRONIZATION FUNCTION (TSF) BASED ON FINE TIME MEASUREMENT (FTM) MESSAGES

(71) Applicant: INTEL IP CORPORATION, Santa Clara, CA (US)

(72) Inventors: Jonathan Segev, Tel Mond (IL); Adrian Stephens, Cambridge (GB)

(73) Assignee: INTEL IP CORPORATION, Santa Clara, CA (US)

( * ) Notice: Subject to any disclaimer, the term of this patent is extended or adjusted under 35 U.S.C. 154(b) by 232 days.

(21) Appl. No.: 14/998,246

(22) Filed: Dec. 26, 2015

(65) Prior Publication Data

US 2016/0366660 A1 Dec. 15, 2016

Related U.S. Application Data

(60) Provisional application No. 62/175,523, filed on Jun. 15, 2015.

(51) Int. Cl.
*H04W 56/00* (2009.01)
*H04W 24/08* (2009.01)

(52) U.S. Cl.
CPC ....... *H04W 56/0045* (2013.01); *H04W 24/08* (2013.01); *H04W 56/0015* (2013.01)

(58) Field of Classification Search
CPC .................................................. H04W 56/0045
See application file for complete search history.

(56) References Cited

U.S. PATENT DOCUMENTS

2008/0258973 A1* 10/2008 Heidari-Bateni ..... G01S 13/767
342/387
2010/0150117 A1* 6/2010 Aweya ..................... G01S 5/14
370/338

(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

*Primary Examiner* — Parth Patel
(74) *Attorney, Agent, or Firm* — Shichrur & Co.

(57) ABSTRACT

Some demonstrative embodiments include apparatuses, systems and/or methods of determining a Time Synchronization Function (TSF) based on Fine Timing Measurement (FTM) messages. For example, a wireless station may be configured to determine a first TSF value of a local TSF of the wireless station at arrival of a first FTM message from a responder station; to determine a second TSF value of the local TSF at arrival of a second FTM message from the responder station, the second FTM message including a first Time of Departure (TOD) value of the first FTM message; to process a third FTM message from the responder station, the third FTM message including a second TOD value of the second FTM message; and to apply to the local TSF a TSF correction based at least on the first TSF value, the second TSF value, the first TOD value, and the second TOD.

21 Claims, 10 Drawing Sheets

(56) References Cited

U.S. PATENT DOCUMENTS

| | | | |
|---|---|---|---|
| 2012/0182180 A1* | 7/2012 | Wolf | G01S 5/021 342/357.29 |
| 2012/0210130 A1* | 8/2012 | Buer | H04L 63/068 713/168 |
| 2012/0221853 A1* | 8/2012 | Wingert | G06F 21/10 713/160 |
| 2014/0073352 A1* | 3/2014 | Aldana | G01S 5/10 455/456.1 |
| 2014/0197990 A1* | 7/2014 | Bogatin | G01S 5/0284 342/463 |
| 2014/0286324 A1* | 9/2014 | Aldana | H04W 84/12 370/338 |
| 2014/0295877 A1* | 10/2014 | Hart | H04W 4/02 455/456.1 |
| 2014/0355461 A1* | 12/2014 | Aldana | G01S 5/00 370/252 |
| 2015/0094103 A1* | 4/2015 | Wang | H04W 4/023 455/456.6 |
| 2015/0098460 A1* | 4/2015 | Wang | H04W 4/08 370/338 |
| 2015/0099538 A1* | 4/2015 | Wang | H04W 4/02 455/456.1 |
| 2015/0264530 A1* | 9/2015 | Prechner | H04W 4/025 455/456.2 |
| 2016/0007309 A1* | 1/2016 | Lee | H04W 56/002 370/350 |
| 2016/0021496 A1* | 1/2016 | Tamhane | H04W 4/02 455/456.2 |
| 2016/0150499 A1* | 5/2016 | Aldana | H04L 5/0055 455/456.2 |
| 2016/0150500 A1* | 5/2016 | Agrawal | H04W 64/00 370/329 |
| 2016/0277882 A1* | 9/2016 | Passler | H04W 4/02 |
| 2016/0308738 A1* | 10/2016 | Sinibaldi | H04W 12/02 |
| 2016/0353306 A1* | 12/2016 | Sanderovich | H04W 24/10 |

* cited by examiner

APPARATUS, SYSTEM AND METHOD OF DETERMINING A TIME SYNCHRONIZATION FUNCTION (TSF) BASED ON FINE TIME MEASUREMENT (FTM) MESSAGES

CROSS REFERENCE

This application claims the benefit of and priority from U.S. Provisional Patent Application No. 62/175,523 entitled "APPARATUS, SYSTEM AND METHOD OF TIME SYNCHRONIZATION USING FINE TIMING MEASUREMENT (FTM)", filed Jun. 15, 2015, the entire disclosure of which is incorporated herein by reference.

TECHNICAL FIELD

Embodiments described herein generally relate to determining a Time Synchronization Function (TSF) based on Fine Timing Measurement (FTM) messages.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

A Fine Timing Measurement (FTM) Protocol, e.g., in accordance with an IEEE 802.11REVmc Specification, may include measuring a Round Trip Time (RTT) from a wireless station (STA) to a plurality of other STAs, e.g., several Access Point (AP) STAs and/or non-AP STAs, for example, to perform trilateration and/or calculate the location of the STA.

However, an accuracy of the calculated location of the STA may depend on time synchronization between the STA and the plurality of other STAs. Conventional mechanisms to maintain synchronization may be inefficient and/or power consuming.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
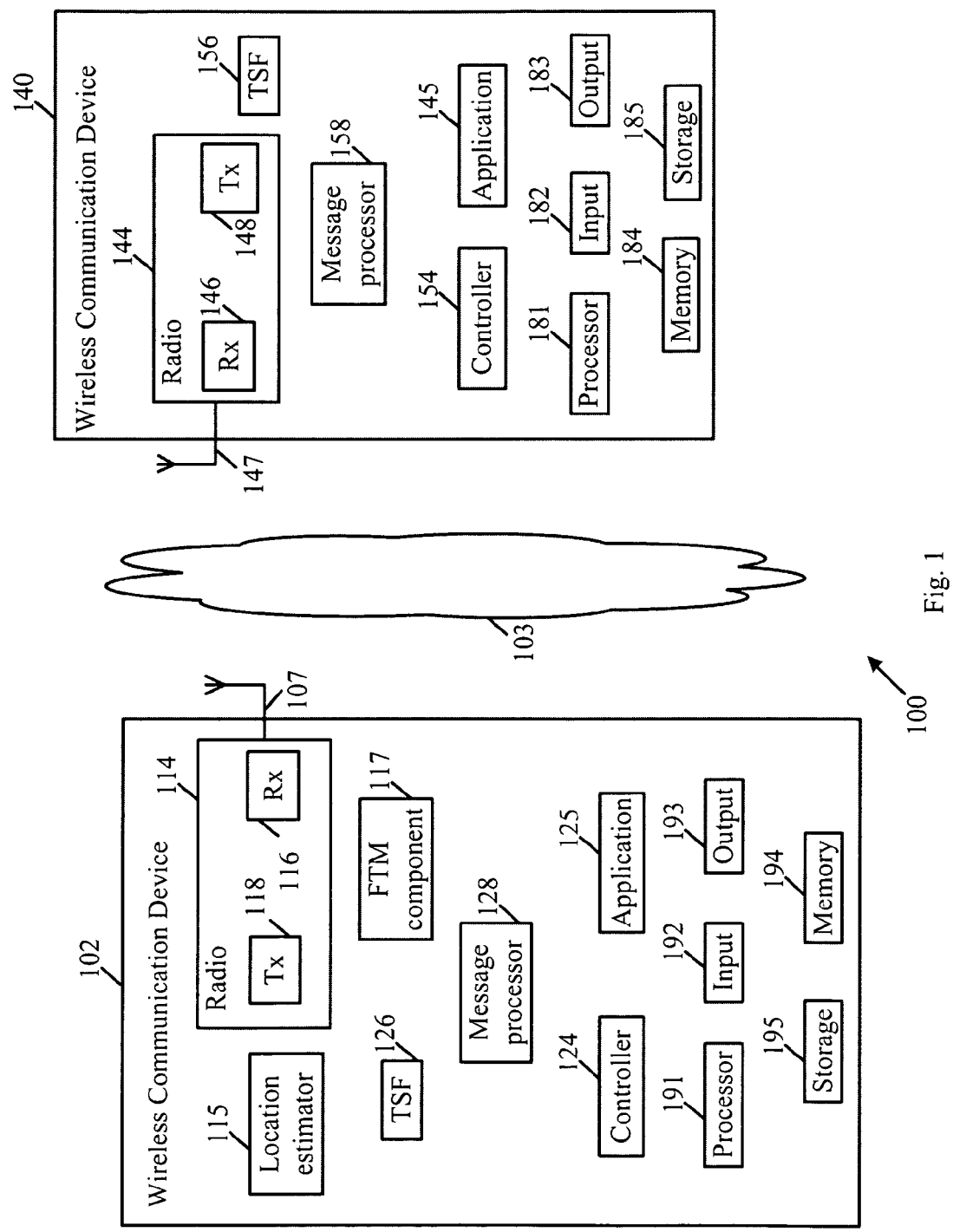
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless Fidelity (WiFi) Alliance (WFA) Specifications (including *Wi-Fi Neighbor Awareness Networking (NAN) Technical Specification, Version* 1.0, May 1, 2015) and/or future versions and/or derivatives thereof, devices and/or networks operating in accordance with existing WFA Peer-to-Peer (P2P) specifications (*WiFi P2P technical specification, version* 1.5, Aug. 4, 2014) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, Final specification) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; IEEE802.11ac-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); and/or IEEE-802.11REVmc ("*IEEE 802.11-REVmc™/D3.0, June* 2014 *draft standard for Information technology—Telecommunications and information exchange between systems Local and metropolitan area networks Specific requirements; Part 11: Wireless LAN Medium Access Control (MAC) and Physical Layer (PHY) Specification*")) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, at least one device of devices 102 and 140 may include a mobile device. For example, device 102 may include a Smartphone, and/or device 140 may include an AP.

In one example, both devices 102 and 140 may include mobile devices. For example, device 102 may include a Smartphone, and/or device 140 may include a notebook.

In some demonstrative embodiments, devices 102 and/or device 140 may include, operate as, and/or perform the functionality of one or more STAs. For example, device 102 may include at least one STA, and/or device 140 may include at least one STA.

In some demonstrative embodiments, devices 102 and/or device 140 may include, operate as, and/or perform the functionality of one or more WLAN STAs.

In some demonstrative embodiments, devices 102 and/or device 140 may include, operate as, and/or perform the functionality of one or more Wi-Fi STAs.

In some demonstrative embodiments, devices 102 and/or device 140 may include, operate as, and/or perform the functionality of ToF responder and/or a ToF initiator.

In some demonstrative embodiments, devices 102 and/or device 140 may include, operate as, and/or perform the functionality of one or more BT devices.

In some demonstrative embodiments, devices 102 and/or device 140 may include, operate as, and/or perform the functionality of one or more Neighbor Awareness Networking (NAN) STAs.

In some demonstrative embodiments, one or more devices of wireless communication devices 102 and/or device 140, e.g., device 140, may include, or may perform the functionality of, an Access Point (AP), e.g., as described below.

For example, the AP may include a router, a PC, a server, a Hot-Spot and/or the like.

In some demonstrative embodiments, one or more devices of wireless communication devices 102 and/or device 140, e.g., device 102, may perform the functionality of a non-AP STA, and/or one or more devices of wireless communication devices 102 and/or device 140, e.g., device 140, may perform the functionality of an AP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a S1G band, and/or any other frequency band.

In some demonstrative embodiments, devices 102 and 140 may include one or more radios to perform wireless communication between devices 102, 140 and/or one or more other wireless communication devices. For example, device 102 may include a radio 114, and/or device 140 may include a radio 144.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radio 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may be configured to communicate over a 2.4 GHz band, a 5 GHz band, a mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controllers 124 and/or 154 may be configured to perform, and/or may trigger devices 102 and/or 140 to perform, one or more communications, may generate and/or communicate one or more messages and/or transmissions, and/or may perform one or more functionalities, operations and/or procedures between devices 102, and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In some demonstrative embodiments, wireless communication medium 103 may include a direct link, e.g., a P2P link, for example, to enable direct communication between device 102 and device 140.

In some demonstrative embodiments, wireless communication devices 102 and/or 140 may perform the functionality of WFA P2P devices. For example, device 102 may perform the functionality of a P2P client device, and/or device 140 may perform the functionality of a P2P group owner (GO) device.

In some demonstrative embodiments, wireless communication devices 102 and/or 140 may form, or communicate as part of, a WiFi direct services (WFDS) network.

For example, device 140 may perform the functionality of a service advertiser and/or a service publisher, e.g., with respect to a first service, and/or device 102 may perform the functionality of a service seeker and/or service subscriber, e.g., with respect to the first service. Additionally or alternatively, device 102 may perform the functionality of a service advertiser and/or a service publisher, e.g., with respect to a second service, and/or device 140 may perform the functionality of a service seeker and/or service subscriber, e.g., with respect to the second service.

In some demonstrative embodiments, at least one device of wireless communication devices 102 and 140 may be part of a WiFi Neighbor Awareness Networking (NAN) network. For example, device 102 may include a NAN device, which may be part of a NAN network, while device 140 may not include a NAN device and may not be part of a NAN network.

In other embodiments, wireless communication devices 102 and/or 140 may form, and/or communicate as part of, any other network.

In some demonstrative embodiments, devices 102 may include one or more applications configured to provide and/or to use one or more location based services, e.g., a social application, a navigation application, a location based advertising application, and/or the like. For example, device 102 may include an application 125 to be executed by device 102.

In some demonstrative embodiments, application 125 may use range information between devices 102 and 140, for example, to determine an estimated location of device 102, e.g., with respect to a coordinate system, e.g., a World Geodetic System 1984 (WGS84), and/or a local coordination.

In one example, device 102 may include a Smartphone and device 140 may include an AP, which is located in a shop, e.g., in a shopping mall. According to this example, application 125 may use the range information to determine a relative location of device 102 with respect to device 140, for example, to receive sale offers from the shop.

In some demonstrative embodiments, device 102 may include a location estimator 115 configured to estimate a location of device 102, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, location estimator 115 may be configured to estimate the location of device 102, for example, based on time based range measurements, for example, with device 140 and/or one or more other devices.

In some demonstrative embodiments, the time based range measurements may be performed using WLAN communications, e.g., WiFi. For example, using WiFi to perform the time based range measurements may enable, for example, increasing an indoor location accuracy of the location estimation of device 102, e.g., in an indoor environment.

In some demonstrative embodiments, the time based range measurements may include a round trip time (RTT) measurement (also referred to as Time of Flight (ToF)).

The ToF may be defined as the overall time a signal propagates from a first station, e.g., device 102, to a second station, e.g., device 140, and back to the first station. A distance between the first and second stations may be determined based on the ToF value, for example, by dividing the ToF value by two and multiplying the result by the speed of light.

In some demonstrative embodiments, the ToF measurement procedure may include a Fine Timing Measurement (FTM) procedure.

In some demonstrative embodiments, device 102 may be configured to utilize an FTM Protocol, for example, in accordance with the IEEE 802.11REVmc D4.0 Specification, and/or any other specification, standard and/or protocol. For example, device 102 may be configured to use the FTM protocol to measure the RTT from a STA implemented by device 102 to a plurality of other STAs, e.g., including device 140, for example, including one or more AP STAs and/or non-AP STAs.

In some demonstrative embodiments, device 102 may include a Fine Time Measurement (FTM) component 117 configured to perform one or more FTM operations, communications and/or procedures with one or more stations, for example, device 140, e.g., as described below.

In some demonstrative embodiments, FTM component 117 may include, or may be implemented, using suitable circuitry and/or logic, e.g., controller circuitry and/or logic, scheduler circuitry and/or logic, processor circuitry and/or logic, memory circuitry and/or logic, and/or any other circuitry and/or logic, which may be configured to perform at least part of the functionality of FTM component 117. Additionally or alternatively, one or more functionalities of FTM component 117 may be implemented by logic, which may be executed by a machine and/or one or more processors, e.g., as described below.

In some demonstrative embodiments, FTM component 117 may be configured to perform one or more operations of, and/or at least part of the functionality of, message processor 128 and/or controller 124, for example, to trigger communication of one or more FTM messages, e.g., as described below.

In some demonstrative embodiments, at least part of the functionality of FTM component 117 may be implemented by an integrated circuit, for example, a chip, e.g., a System on Chip (SoC). In one example, the chip or SoC may be configured to perform one or more functionalities of radio 114. For example, the chip or SoC may include one or more elements of FTM component 117, and/or one or more elements of radio 114. In one example, FTM component 117, and radio 114 may be implemented as part of the chip or SoC. In other embodiments, FTM component 117, and/or radio 114 may be implemented by one or more additional or alternative elements of device 102.

In some demonstrative embodiments, FTM component 117 may be configured to trigger the FTM measurements, for example, periodically and/or or upon a request from an application executed by device 102, for example, to determine an accurate location of device 102, e.g., as described below.

In some demonstrative embodiments, FTM component 117 may be configured to perform one or more measurements according to an FTM protocol, for example, in accordance with an IEEE 802.11 Specification, e.g., an IEEE 802.11RevMC Specification and/or any other specification and/or protocol.

In some demonstrative embodiments, FTM component 117 may be configured to perform one or more operations of an FTM initiator to perform one or more FTM measurements with one or more FTM responders, e.g., including device 140.

In some demonstrative embodiments, FTM component 117 may be configured to perform one or more proximity, ranging, and/or location estimation measurements, e.g., in an indoor location, based on the FTM measurements. For example, the FTM measurements may provide a relatively accurate estimation of location, range and/or proximity, e.g., in an indoor location.

Some demonstrative embodiments are described herein with respect to an FTM component, e.g., FTM component 117, configured to perform measurements according to an FTM protocol and/or procedure. However, in other embodiments, the FTM component may be configured to perform any other additional or alternative type of Time of Flight (ToF) measurements, ranging measurements, positioning measurements, proximity measurements, and/or location estimation measurements, e.g., according to any additional or alternative protocol and/or procedure.

In some demonstrative embodiments, device 102, controller 124, and/or FTM component 117 may initiate the ToF measurement procedure. For example, device 102 may perform the functionality of an initiator device, e.g., as described below with reference to FIG. 2.

Figure 2:
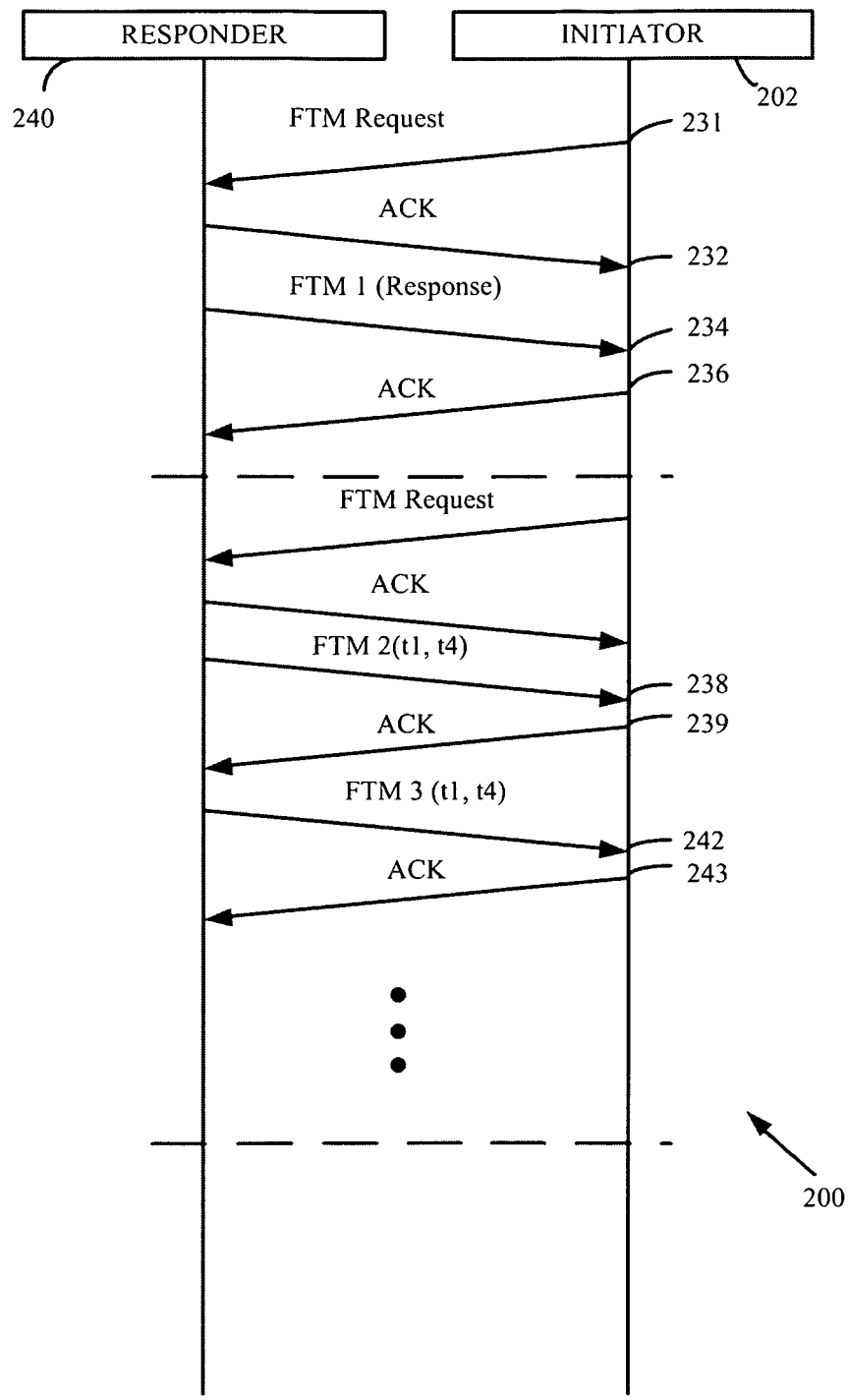
FIG. 2 is a schematic illustration of a Fine Time Measurement (FTM) procedure, in accordance with some demonstrative embodiments.

Reference is made to FIG. 2, which schematically illustrates a sequence diagram, which demonstrates operations and interactions between a first wireless communication device 202 ("Initiating STA" or "initiator") and a second wireless communication device 240 ("Responding STA" or "responder"), of an FTM procedure 200, in accordance with some demonstrative embodiments. For example, device 202 may perform the functionality of device 102 (FIG. 1), and/or device 240 may perform the functionality of a device 140 (FIG. 1).

As shown in FIG. 2, device 202 may transmit to device 240 an FTM request message 231 to request to perform the FTM procedure 200 with device 240. For example, FTM component 117 (FIG. 1) may trigger, instruct, cause and/or request radio 114 (FIG. 1) to transmit the FTM request message 231.

As shown in FIG. 2, device 240 may transmit an FTM request acknowledgement (ACK) 232 to device 202, to acknowledge receipt of the FTM request message 231, and to confirm the request to perform the FTM procedure. For example, FTM component 117 (FIG. 1) may trigger, instruct, cause and/or request radio 114 (FIG. 1) to process reception of the FTM request ACK message 232.

As shown in FIG. 2, FTM procedure 200 may include an FTM measurement period, during which devices 202 and 240 may communicate FTM measurement frames, e.g., as described below. For example, FTM component 117 (FIG. 1) may trigger, instruct, cause and/or request radio 114 (FIG. 1) to communicate one or more messages during the FTM measurement period, e.g., as described below.

In some demonstrative embodiments, devices 202 and/or 240 may communicate the FTM measurement frames between devices 202 and 240 during the FTM measurement period, for example, to determine a Time of Flight (ToF) value between devices 202 and 240.

In some demonstrative embodiments, as shown in FIG. 2, device 240 may transmit an FTM message 234 to device 202, at a time, denoted t1. The time t1 may be a Time of Departure (ToD), denoted ToD(M), of message 234.

In some demonstrative embodiments, as shown in FIG. 2, device 202 may receive message 234 and may determine a time, denoted t2, e.g., by determining a Time of Arrival (ToA), denoted ToA(M), of message 234. For example, FTM component 117 (FIG. 1) may be configured to trigger, instruct, cause and/or request radio 114 (FIG. 1) to process receipt of message 234, and/or FTM component 117 (FIG. 1) may be configured to determine the ToA of message 234.

In some demonstrative embodiments, as shown in FIG. 2, device 202 may transmit a message 236 to device 240, at a time, denoted t3. Message 236 may include, for example, an acknowledgement message transmitted in response to FTM message 234. The time t3 may be a ToD, denoted ToD (ACK), of the message 236. For example, FTM component 117 (FIG. 1) may be configured to trigger, instruct, cause and/or request radio 114 (FIG. 1) to transmit message 236, and/or FTM component 117 (FIG. 1) may be configured to determine the ToD of message 236.

In some demonstrative embodiments, as shown in FIG. 2, device 240 may receive message 236 and may determine a time, denoted t4, e.g., by determining a ToA, denoted ToA(ACK), of message 236.

In some demonstrative embodiments, as shown in FIG. 2, device 240 may transmit an FTM message 238 to device 202. Message 238 may include, for example, information corresponding to the time t1 and/or the time t4. For example, message 238 may include a timestamp, e.g., a ToD timestamp, including the time t1, and a timestamp, e.g., a ToA timestamp, including the time t4.

In some demonstrative embodiments, as shown in FIG. 2, device 202 may receive message 238. For example, FTM component 117 (FIG. 1) may be configured to trigger, instruct, cause and/or request radio 114 (FIG. 1) to process receipt of message 238, and/or FTM component 117 (FIG. 1) may be configured to access, extract and/or process the information corresponding to the time t1 and/or the time t4.

In some demonstrative embodiments, as shown in FIG. 2, device 202 may transmit a message 239 to device 240. Message 239 may include, for example, an acknowledgement message transmitted in response to message 238. For example, FTM component 117 (FIG. 1) may be configured to trigger, instruct, cause and/or request radio 114 (FIG. 1) to transmit message 239.

In some demonstrative embodiments, as shown in FIG. 2, device 240 may transmit an FTM message 242 to device 202. Message 242 may include, for example, information corresponding to the time t1 and/or the time t4. For example, message 242 may include a timestamp, e.g., a ToD timestamp, including the time t1, and a timestamp, e.g., a ToA timestamp, including the time t4.

In some demonstrative embodiments, as shown in FIG. 2, device 202 may receive message 242. For example, FTM component 117 (FIG. 1) may be configured to trigger, instruct, cause and/or request radio 114 (FIG. 1) to process receipt of message 242, and/or FTM component 117 (FIG. 1) may be configured to access, extract and/or process the information corresponding to the time 11 and/or the time t4.

In some demonstrative embodiments, as shown in FIG. 2, device 202 may transmit a message 243 to device 240. Message 239 may include, for example, an acknowledgement message transmitted in response to message 242. For example, FTM component 117 (FIG. 1) may be configured to trigger, instruct, cause and/or request radio 114 (FIG. 1) to transmit message 243.

In some demonstrative embodiments, device 202 may determine a ToF between device 202 and device 240, for example, based on message 238 and/or message 242. For example, FTM component 117 (FIG. 1) may be configured determine the ToF, e.g., as described below.

For example, device 202 may determine the ToF based on an average, or any other function, applied to the time values t1, t2, t3 and t4. For example, device 202 may determine the ToF, e.g., as follows:

$$\text{ToF} = [(t4 - t1) - (t3 - t2)]/2 \quad (1)$$

In some demonstrative embodiments, device 202 may determine the distance between devices 202 and 240 based on the calculated ToF.

For example, device 202 may determine the distance, denoted $r_k$, e.g., as follows:

$$r_k = \text{ToF} * C \quad (2)$$

wherein C denotes the radio wave propagation speed.

Referring back to FIG. 1, in some demonstrative embodiments, location estimator 115 may be configured to determine a location of device 102, for example, using a plurality of ranges, e.g., a plurality of ranges corresponding to a plurality of FTM procedures of FIG. 2, from a plurality of other STAs, e.g., by performing trilateration.

In some demonstrative embodiments, different STAs, e.g., different APs, may operate over different channels, and an initiator STA, e.g., device 102, may be associated with a plurality of the STAs, for example, to perform the location and/or FTM measurements with the plurality of stations.

In some demonstrative embodiments, the initiating STA, e.g., device 102, may be required to keep synchronization to local clocks of a plurality of APs, for example, when performing the FTM protocol with respect to the plurality of APs.

In some demonstrative embodiments, it may not be efficient to use current and/or conventional mechanisms of time synchronization to synchronize between the initiating STA, e.g., device 102, and a plurality of stations, e.g., including device 140.

In one example, the current and/or conventional mechanisms of time synchronization may not be efficient, e.g., in terms of power consumption and/or medium consumption.

In another example, the current and/or conventional mechanisms of time synchronization may not be efficient in terms of data link performance.

In some demonstrative embodiments, a passive scan mechanism, e.g., including passive scanning to receive periodically transmitted beacons may not be efficient, e.g., as described below with reference to FIG. 3.

In some demonstrative embodiments, an active scan mechanism, e.g., including active scanning to transmit a probe request and receive a probe response may not be efficient, e.g., as described below with reference to FIG. 4.

Figure 3:
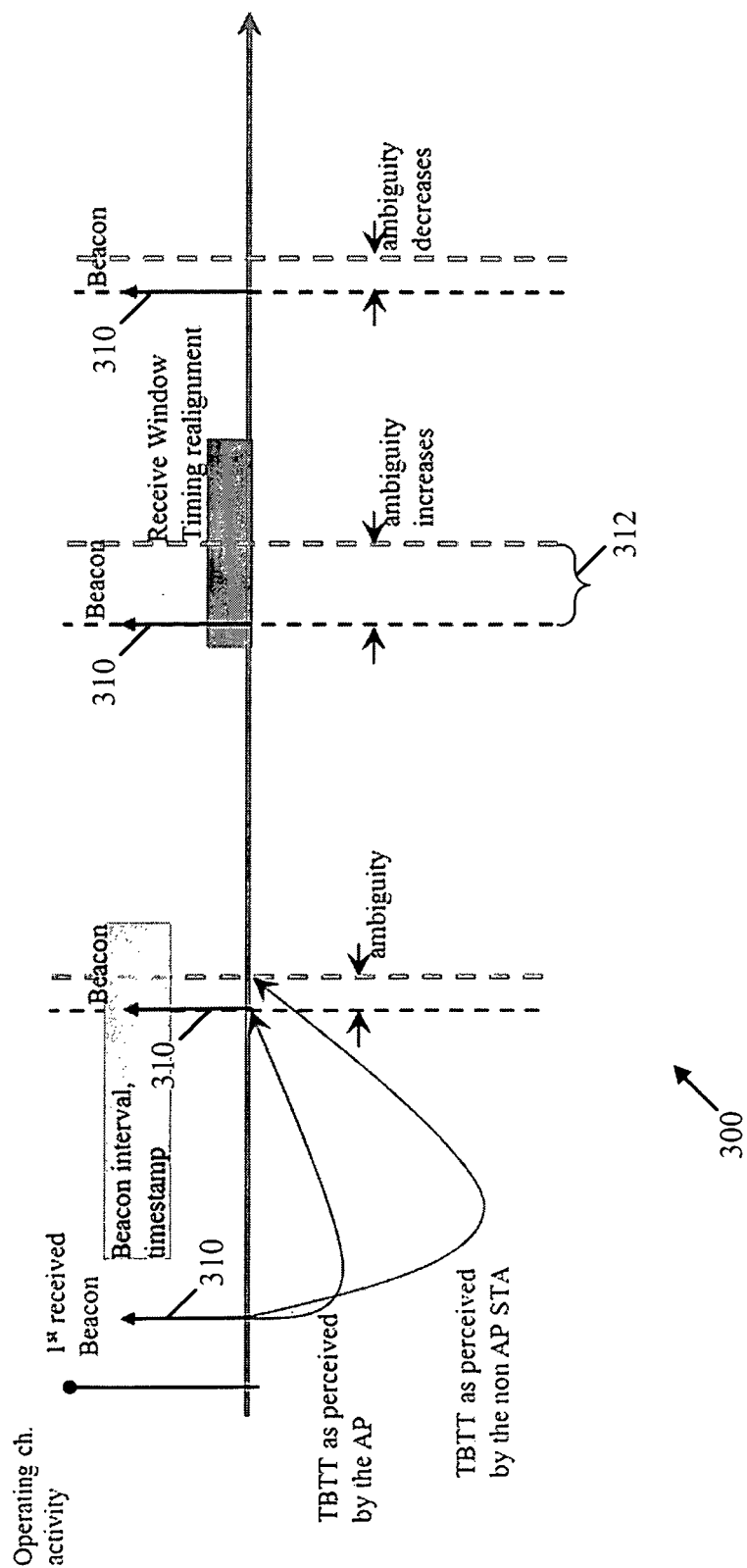
FIG. 3 is a schematic illustration of a passive scan scheme.

Reference is made to FIG. 3, which schematically illustrates a passive scan scheme 300.

As shown in FIG. 3, passive scan scheme 300 may include periodically transmitting beacons 310 from an AP, e.g., which may be received by an initiating STA.

In some demonstrative embodiments, beacons 310 may include timing information, for example, to synchronize between the initiating STA, and the AP.

As shown in FIG. 3, a drift 312 between clocks of the STA and the AP may increase, for example, between subsequent beacons 310, and/or if the STA does not receive a beacon 310, e.g., if the STA moves from an operating channel of the AP transmitting beacons 310.

In some demonstrative embodiments, the passive scan mechanism may degrade data link performance, for example, if the STA has ongoing data exchange, e.g. to retrieve location contextual information, such as maps, to perform an ongoing VoIP call, and the like. The reduced data link performance may result, for example, from the need to be absent from the AP operational channel.

Figure 4:
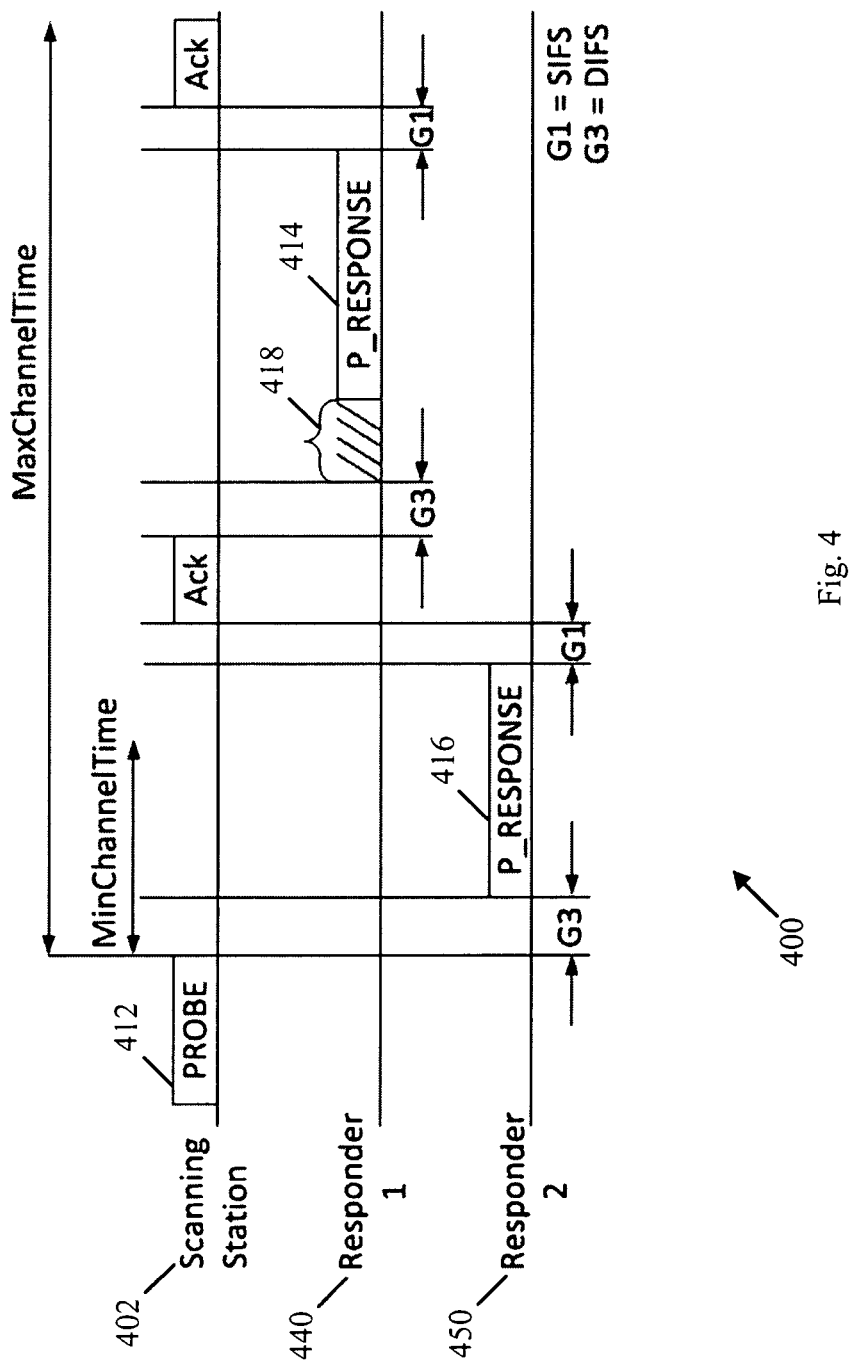
FIG. 4 is a schematic illustration of an active scan scheme.

Reference is made to FIG. 4, which schematically illustrates an active scan scheme 400 between a scanning/initiating station 402, a first responder station 440 and/or a second responder station 450.

As shown in FIG. 4, active scan scheme 400 may include transmitting from the scanning station a probe request 412, and receiving a probe response 414 from responder station 440 and a probe response 416 from responder station 450.

In some demonstrative embodiments, probe response 414 and/or a probe response 416 may include timing information, for example, to synchronize between the scanning STA 402, and the stations 440 and/or 450.

As shown in FIG. 4, a drift 418 between clocks of the STA 402 and the stations 440 and/or 450 may increase, for example, until reception of probe response 414.

In some demonstrative embodiments, the active scan mechanism may degrade data link performance, for example, if the STA 402 has ongoing data exchange, e.g. to retrieve location contextual information, such as maps, to perform an ongoing VoIP call, and the like. The reduced data link performance may result, for example, due to the need to be absent from the AP operational channel.

Refereeing back to FIG. 1, in some demonstrative embodiments, device 102 may use the FTM procedure, e.g., the FTM procedure of FIG. 2, to perform an RTT measurement procedure, for example, for distance measurement and/or location measurement, e.g., with respect to one or more devices, e.g., including device 140.

In some demonstrative embodiments, when using the FTM procedure, a responder STA, for example, an AP, e.g., device 140, may allocate one or more time windows (also referred to as "burst instances", "burst durations", or "bursts").

In some demonstrative embodiments, device 102 may be required to be available to communicate with device 140 during the bursts.

In some demonstrative embodiments, the bursts may be derived from a Time Synchronization Function (TSF) 156 of device 140. For example, a start of a burst, a duration between consecutive bursts, and/or an end of the burst may be derived from TSF 156.

In some demonstrative embodiments, device 102 may be required to indicate its availability within an allocated burst instance, for example, by using a Fine Timing Request trigger frame.

In some demonstrative embodiments, device 102 may include a TSF 126, configured to provide timing information to device 102.

In some demonstrative embodiments, the FTM trigger frame may be transmitted by device 102, for example, prior to the burst instance, or after a substantial part of a burst instance already passed, for example, if TSF 126 of device 102 is not synchronized to the TSF 156.

In one example, device 102 may leave a channel used by device 140, for example, prior to an ending of the burst instance, for example, if TSF 126 is not synchronized to TSF 156. This premature leaving of the channel used by device 140 may result in lost measurement frames, and/or in measurement frames being communicated too late, which may waste power on device 102.

In some demonstrative embodiments, a time alignment drift, for example, between TSF 126 and TSF 156, may increase, for example, if no re-alignment and/or synchronization are performed to synchronize TSF 126 to TSF 156.

In some demonstrative embodiments, the time alignment drift between TSF 126 and TSF 156 may cause misalignments between timing of the burst periods allocated by device 140, and the timing of the bursts periods, as perceived by device 102, e.g., as described below with reference to FIG. 5.

Figure 5:
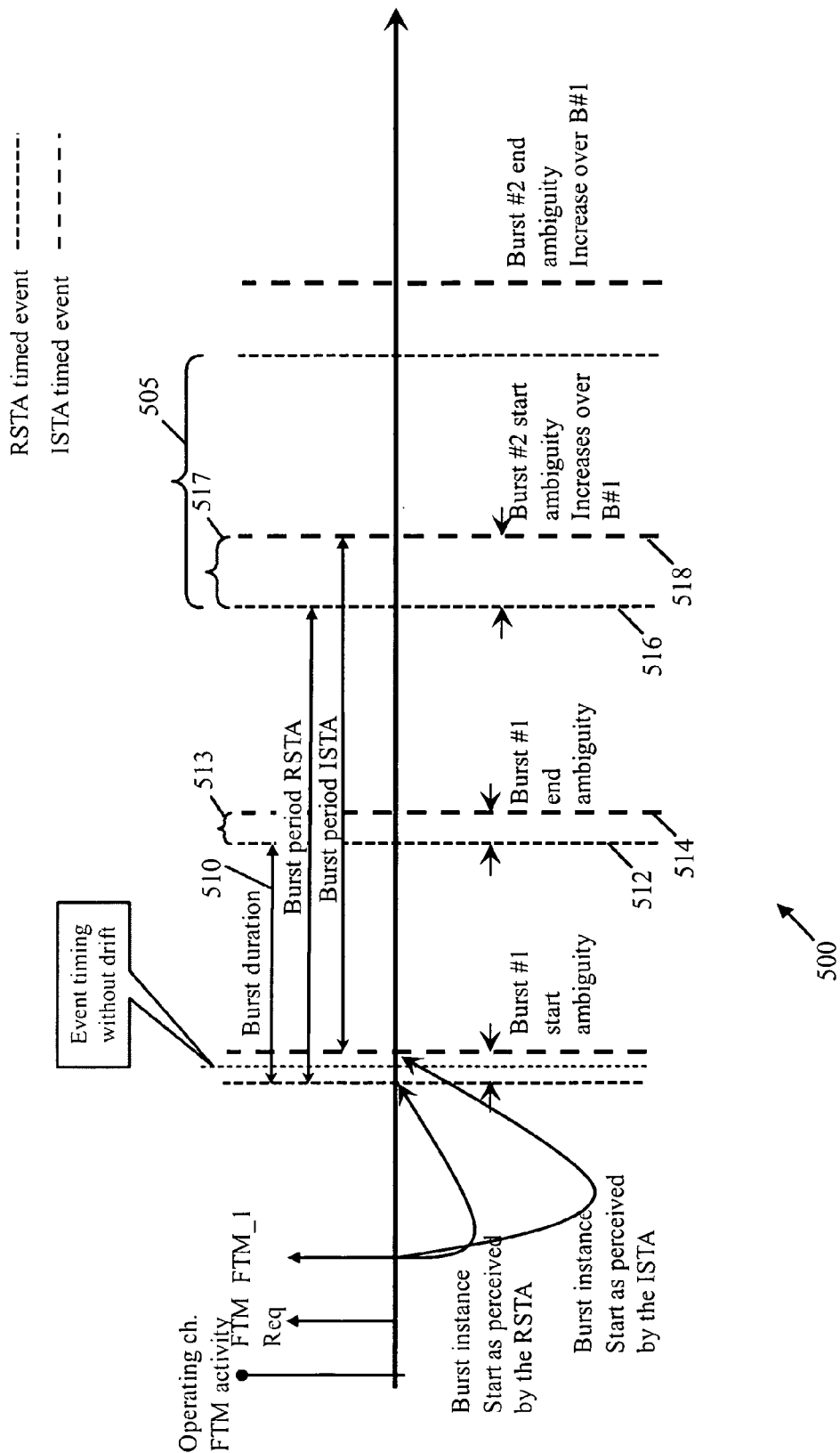
FIG. 5 is a schematic illustration of an FTM time alignment drift.

Reference is made to FIG. 5, which schematically illustrates an FTM time alignment drift, which may result, for example, from a drift between a local TSF of an initiator station and a TSF of a responder station.

As shown in FIG. 5, a responder station may allocate a plurality of bursts 505 having a burst duration 510.

As shown in FIG. 5, an end 512 of a first burst 510 may be perceived by an initiating station at a time 514, for example, if TSF 126 and TSF 156 (FIG. 1) are not synchronized.

As shown in FIG. 5, an alignment drift 513 between an end of the first burst and the end of the first burst as perceived by the initiator station may occur.

As shown in FIG. 5, an end 516 of a second burst may be perceived by the initiating station, at a time 518, for example, if TSF 126 and TSF 156 (FIG. 1) are still not synchronized.

As shown in FIG. 5, an alignment drift 517 between an end of the second burst and the end of the second burst as perceived by the initiator station may occur.

As shown in FIG. 5, an alignment drift between the end of a subsequent burst and an end of the subsequent burst as perceived by the initiator station may increase, for example, as long as TSF 126 and TSF 156 (FIG. 1) are not synchronized. For example, alignment drift 517 may be greater than alignment drift 513.

Referring back to FIG. 1, in some demonstrative embodiments, device 102 may be configured to determine and/or retrieve a value of TSF 156, and/or to synchronize TSF 126 to TSF 156, for example, even without using the current and/or conventional mechanisms of time synchronization.

In one example, device 102 may be configured to determine and/or retrieve a value of TSF 156, and/or to synchronize TSF 126 to TSF 156, for example, even without the need to be available to receive beacons from device 140, e.g., even without performing a passive scan.

In another example, device 102 may be configured to determine and/or retrieve a value of TSF 156, and/or to synchronize TSF 126 to TSF 156, for example, even without performing an active scan, which may be medium consuming.

In another example, device 102 may be configured to determine and/or retrieve a value of TSF 156, and/or to synchronize TSF 126 to TSF 156, for example, even without transmitting a time critical message, for example, a message which its content dependent on its transmission time.

In some demonstrative embodiments, device 102 may be configured to use one or more FTM measurement frames to maintain synchronization between TSF 126 and TSF 156, for example, once an initial synchronization has been obtained between TSF 126 and 156, e.g., using the passive scan mechanism, e.g., according to the passive scan scheme of FIG. 3, and/or an the active scan mechanism, e.g., according to the active scan scheme of FIG. 4, for example, as described below.

In some demonstrative embodiments, device 102 may be configured to use the one or more FTM measurement frames, for example, in accordance with an existing FTM procedure, e.g., in accordance with an IEEE 802.11REVmc D4.0 Specification, for example, without modifying the FTM procedure.

In some demonstrative embodiments, device 102 may be configured to maintain the synchronization between TSF 126 and TSF 156, for example, even without requiring the performing of a passive scan or an active scan, for example, to retrieve timing information from device 140.

In some demonstrative embodiments, device 102, may be configured to determined, monitor and/or maintain a time difference between consecutive successful FTM measurements with device 140, for example, Time of Arrival (TOA) measurements and/or Time of Departure (TOD) measurements, e.g., as described below.

In some demonstrative embodiments, device 102 may be able to acquire a good time estimate of the drift alignment between TSF 126 and TSF 156, for example, based on a comparison between the local time interval as measured by device 102, and the local time interval as measured device 140.

In some demonstrative embodiments, device 102 may be configured to compare consecutive delta (interval) values as measured by device 140 ("the AP delta" or "AP interval") with respective delta values ("the local delta" or "local interval") as locally measured by device 102, e.g., as described below.

In some demonstrative embodiments, device 102 may be configured to determine a correction to a local TSF of device 102, e.g., TSF 126, for example, based on a difference between the AP delta and the local delta, e.g., as described below.

In some demonstrative embodiments, the correction to the TSF 126 of device 102 may synchronize the TSF 126 of device 102 to the TSF 156 of device 140.

In some demonstrative embodiments, device 102 may be configured to determine the AP delta of device 140, for example, using one or more FTM messages from device 140, e.g., as described below.

In some demonstrative embodiments, device 102 may be configured to determine the AP delta of device 140, for example, based on TOA values and/or TOD values received from device 140, for example, in one or more FTM messages, e.g., as described below.

In some demonstrative embodiments, FTM component 117 may be configured to control, cause and/or trigger device 102 to determine a first TSF value, denoted TSF1, of TSF 126, for example, at arrival of a first FTM message from device 140. For example, FTM component 117 may be configured to determine the first TSF value of TSF 126 at arrival of FTM message 234 (FIG. 2).

In some demonstrative embodiments, FTM component 117 may be configured to control, cause and/or trigger device 102 to determine a second TSF value, denoted TSF2, of TSF 126 at arrival of a second FTM message from device 140. For example, device 102 may be configured to determine the second TSF value of TSF 126 at arrival of FTM message 238 (FIG. 2).

In some demonstrative embodiments, the second FTM message from device 140 may include a first Time of Departure (TOD) value, denoted TOD1, of the first FTM message. For example, FTM message 234 (FIG. 2) may include the TOD of FTM message 234 (FIG. 2).

In some demonstrative embodiments, FTM component 117 may be configured to control, cause and/or trigger device 102 to process a third FTM message from device 140. For example, device 102 may be configured to process FTM message 242 (FIG. 2).

In some demonstrative embodiments, the third FTM message may include a second TOD value, denoted TOD2, of the second FTM message. For example, FTM message 242 (FIG. 2) may include the TOD of FTM message 238 (FIG. 2).

In some demonstrative embodiments, FTM component 117 may be configured to control, cause and/or trigger device 102 to apply to TSF 126 a TSF correction based at least on the first TSF value, the second TSF value, the first TOD value, and the second TOD value, e.g., as described below.

In some demonstrative embodiments, FTM component 117 may be configured to control, cause and/or trigger device 102 to determine the TSF correction based on a first difference value and a second difference value.

In some demonstrative embodiments, the first difference value, denoted ΔTSF, may include a difference between the second and first TSF values, e.g., ΔTSF=TSF2−TSF1.

In some demonstrative embodiments, the second difference value, dented ΔTOD, may include a difference between the second and first TOD, e.g., ΔTOD=TOD2−TOD1.

In some demonstrative embodiments, the TSF correction to be applied to TSF 126 may include a difference between the first and second difference values, e.g., TSF correction=ΔTSF−ΔTOD.

In some demonstrative embodiments, FTM component 117 may be configured to control, cause and/or trigger device 102 to determine a timing of one or more FTM burst periods based on TSF 126.

In one example, device 102 may determine the timing of the FTM burst period, e.g., after applying the TSF correction to TSF 126.

In some demonstrative embodiments, FTM component 117 may be configured to control, cause and/or trigger device 102 to communicate the first, second, and third FTM messages during the one or more FTM burst periods, e.g., as described below.

In some demonstrative embodiments, the first and second FTM messages may be messages within a single burst period.

In some demonstrative embodiments, the first FTM message may be within a first burst duration, and the second FTM message may be within a second burst duration subsequent to the first burst duration, e.g., as described below.

In one example, the first FTM message may be within a first burst duration, and the second FTM message may be within a second burst duration immediately subsequent to the first burst duration, e.g., as described below.

In an another example, the first FTM message may be within a first burst duration, and the second FTM message may be within any other second burst duration after the first burst duration, e.g., as described below Reference is made to FIG. 6, which schematically illustrates a structure 600 of an FTM frame parameter, in accordance with some demonstrative embodiments.

In some demonstrative embodiments, devices 102 and 140 (FIG. 1) may communicate structure 600, for example, as part of an FTM action field of messages 232, 238 and/or 242 (FIG. 2).

Figure 6:
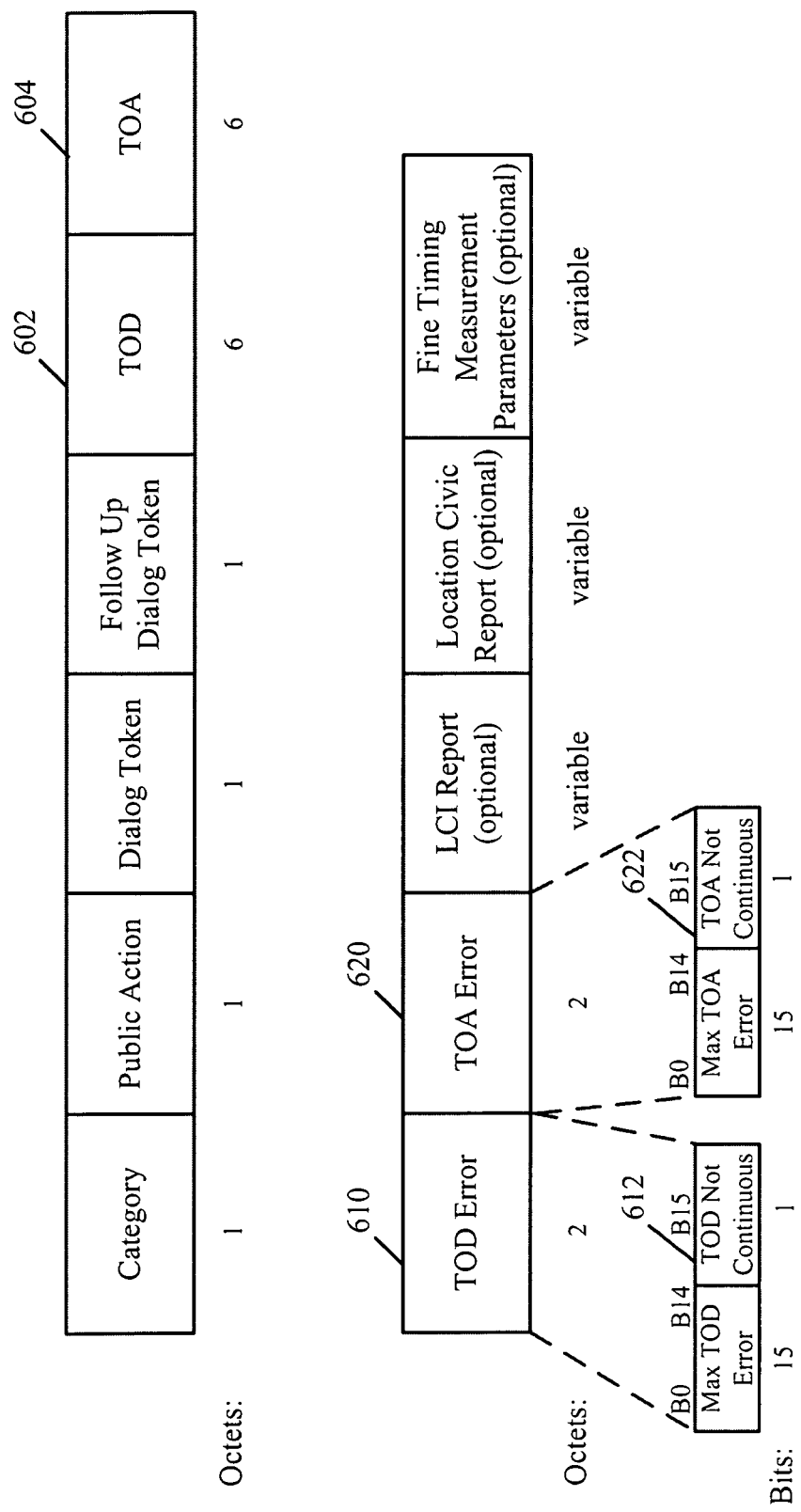
FIG. 6 is a schematic illustration of an FTM frame parameter structure, in accordance with some demonstrative embodiments.

As shown in FIG. 6, structure 600 may include a Time of Arrival (TOA) field 604, and a Time of Departure (TOD) field 602. For example, TOD field 602 may include the TOD value of message 238 (FIG. 2).

As shown in FIG. 6, structure 600 may include a TOA error field 620 and a TOD error field 610.

As shown in FIG. 6, the TOD error field 610 may include a TOD Not Continuous subfield 612, and/or the TOA error field 620 may include a TOA Not Continuous subfield 622.

In some demonstrative embodiments, the TOD Not Continuous subfield 612 may include an indication of whether or not a TOD value in an FTM frame, e.g., in TOD field 602, is a continuous measurement of a previous TOD, e.g., in a previous FTM frame.

In some demonstrative embodiments, the TOA Not Continuous subfield 622 may include an indication of whether or not a TOA in an FTM frame, e.g., in TOA field 604, is a continuous measurement of a previous TOA, e.g., in a previous FTM frame.

In some demonstrative embodiments, if device 140 (FIG. 1) has reset or made any change to either the TOA and TOD timers of device 140 (FIG. 1), for example, such that they are not free running and/or cannot be compared to previous values, device 140 (FIG. 1) may be configured to indicate such a situation using the TOA Not Continuous subfield 620 and/or TOD not Continues subfield 610.

In some demonstrative embodiments, device 102 (FIG. 1), may be configured to determine the TSF correction, for example, based on a TOA value in field 604, and/or a TOD value in field 602, in one or more FTM messages, for example, if the FTM messages include the TOD Not Continuous subfield 610 and/or the TOA Not Continuous subfield 620 set to indicate that the TOD and/or TOA values in the FTM message are continuous to previous values in previous FTM messages.

In some demonstrative embodiments, device 102 (FIG. 1) may select, for example, to use a passive scan and/or an active scan, and/or any other mechanism to synchronize with device 140, for example, if the TOA Not Continuous subfield 620 and/or TOD not Continues subfield 610 indicate that the TOD and/or TOA values in the FTM message are not continuous to previous values in previous FTM messages.

Referring back to FIG. 1, in some demonstrative embodiments, enabling device 102 to synchronize TSF 126 to TSF 156, for example, using the FTM messages, may enable, for example, to increase intervals between consecutive measurements and/or active or passive scans.

In some demonstrative embodiments, the ability to increase the intervals between consecutive measurements may be advantageous, for example, with respect to power constrained devices, for example, IoT devices, sensor devices, and the like, and/or in scenarios, which have static intervals, e.g. a smart device laid on a table and measuring a distance to an ultra-book as part of an electronic leash use case.

In some demonstrative embodiments, enabling device 102 to synchronize to TSF 156, for example, using the FTM messages, may be advantageous, for example, for STAs operating in an unassociated state, e.g., as such STAs may not be required to receive any type of beacons, regular beacons or Delivery Traffic Indication Message (DTIM) beacons, e.g., for purposes other than keeping timing of an AP.

In some demonstrative embodiments, enabling device 102 to synchronize TSF 126 to TSF 156, for example, using the FTM messages, may enable, for example, to avoid a time critical path, which may require the information of the transmission time to be known at time of transmission, for example, in the case of IEEE 802.11 Beacons and/or Probe responses, which may make the scheduling and architecture supporting such messages complex.

Figure 7:
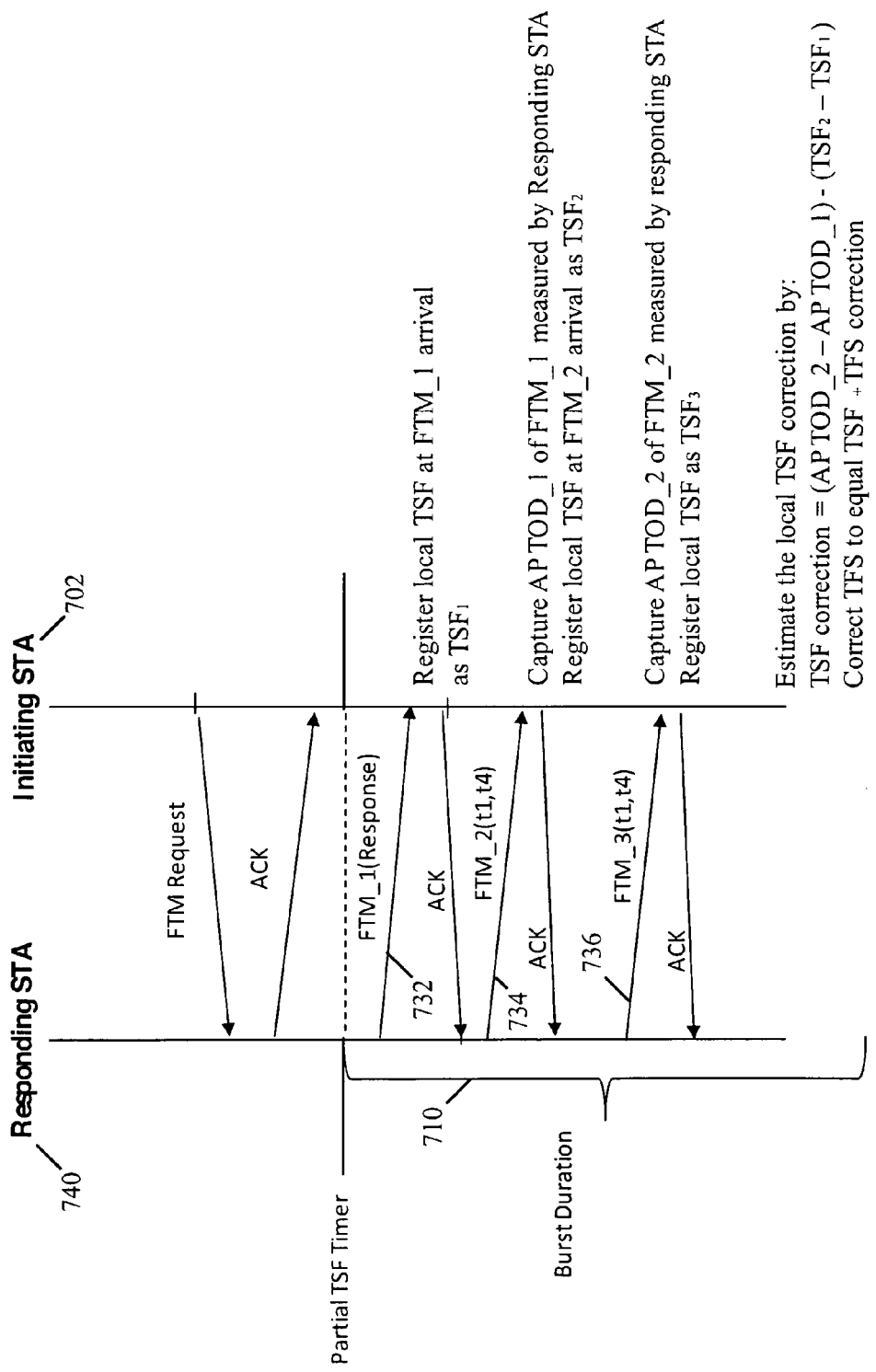
FIG. 7 is a schematic diagram of operations between an Initiating station (STA) and a Responding STA, in accordance with some demonstrative embodiments.

Reference is made to FIG. 7, which schematically illustrates operations between an Initiating STA 702 and a Responding STA 740, in accordance with some demonstrative embodiments. For example, initiating station 702 may perform the functionality of device 102 (FIG. 1), and/or Responding STA 740 may perform the functionality of device 140 (FIG. 1).

In some demonstrative embodiments, the initiating station 702 may receive TOA and TOD values in FTM messages from the responder STA 740, e.g., during a single burst duration 710.

In some demonstrative embodiments, as shown in FIG. 7, the initiating station 702 may determine a correction to a local TSF of the initiator STA 702, for example, based on the timing of FTM messages from the responder STA 740 and the TOA and/or TOD values measured by the responder station 740 and indicated in the FTM messages, e.g., as described below.

In some demonstrative embodiments, as shown in FIG. 7, the initiating STA 702 may register a first TSF value, denoted TSF1, of a local TSF of the initiating STA 702, e.g., at an arrival of a first FTM message 732, denoted FTM_1, from the responding STA 740.

In some demonstrative embodiments, as shown in FIG. 7, a second FTM message 734, denoted FTM_2, from the responding STA 740 may include a first TOD value, denoted AP TOD_1, of the FTM message 732, e.g., as measured at the responding STA 740.

In some demonstrative embodiments, as shown in FIG. 7, the initiating STA 702 may register a second TSF value, denoted TSF2, of the local TSF of the initiating STA 702, e.g., at an arrival of the second FTM message 734, from the responding STA 740.

In some demonstrative embodiments, as shown in FIG. 7, a third message 736, denoted FTM_3, from the responding STA 740 may include a second TOD value, denoted AP TOD_2, of the FTM message 734, e.g., as measured at the responding STA 740.

In some demonstrative embodiments, as shown in FIG. 7, the initiating STA 702 may register a third TSF value, denoted TSF3, of the local TSF of the initiating STA 702, e.g., at an arrival of the third FTM message 736, from the responding STA 740.

In some demonstrative embodiments, the third TSF value may be used, for example, for a subsequent TSF correction.

In some demonstrative embodiments, as shown in FIG. 7, the initiating STA 702 may determine a correction to be applied to the local TSF, denoted TSF Correction, e.g., to adjust and/or synchronize the local TSF to a TSF of the responding STA 740.

In some demonstrative embodiments, as shown in FIG. 7, the initiating STA 702 may determine the TSF correction, for example, based on the TSF values of the local TSF and the TOD values received in the FTM messages, e.g., as follows:

$$\text{TSF Correction} = (\text{AP TOD\_2} - \text{AP TOD\_1}) - (\text{TSF2} - \text{TSF1}) \quad (3)$$

In some demonstrative embodiments, as shown in FIG. 7, the initiating STA 702 may correct the local TSF, for example, as follows:

$$\text{Local TSF} = \text{Local TSF} + \text{TSF Correction} \quad (4)$$

Figure 8:
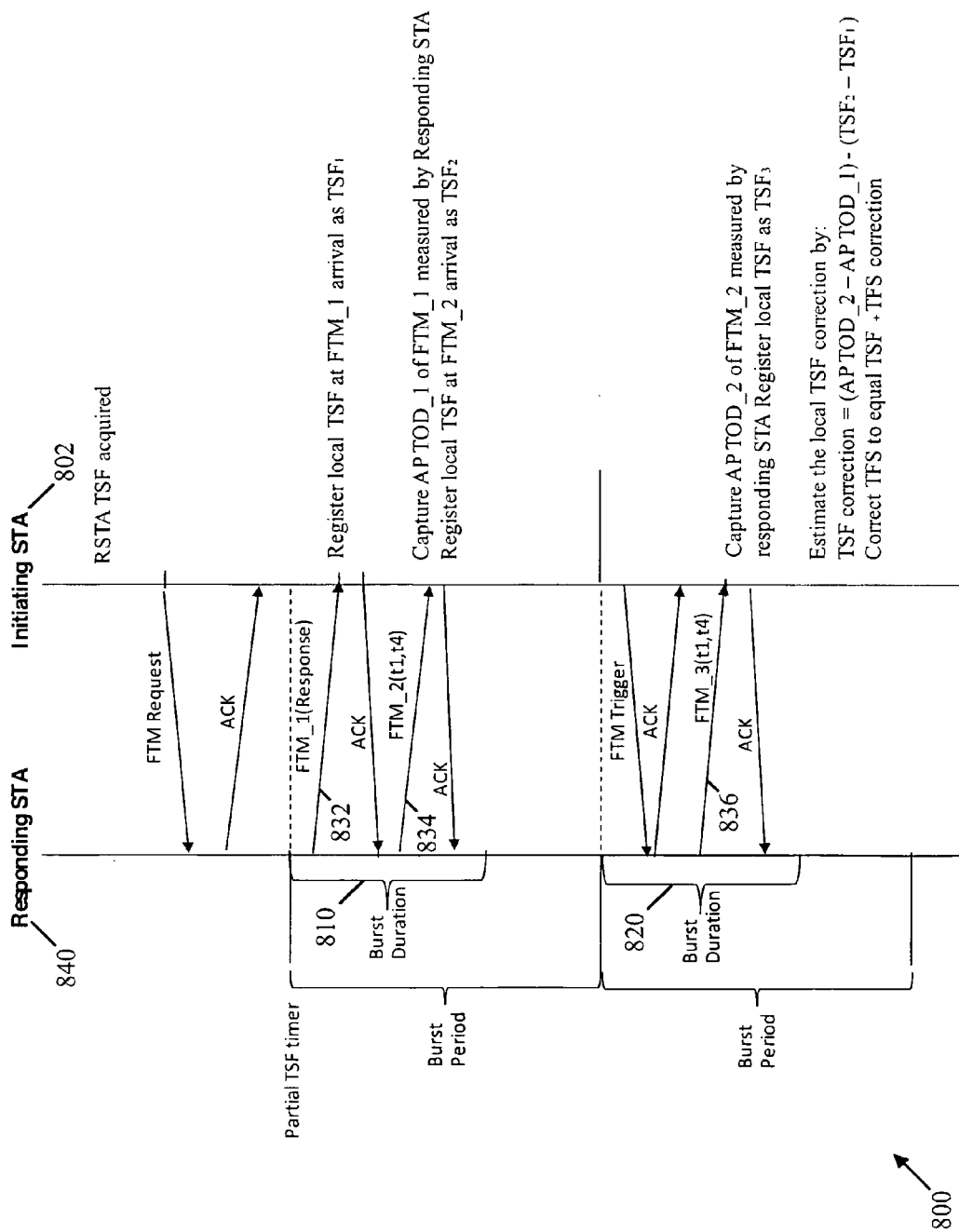
FIG. 8 is a schematic diagram of operations between an Initiating station (STA) and a Responding STA, in accordance with some demonstrative embodiments.

Reference is made to FIG. 8, which schematically illustrates operations between an Initiating STA 802 and a Responding STA 840, in accordance with some demonstrative embodiments. For example, initiating station 802 may perform the functionality of device 102 (FIG. 1), and/or Responding STA 840 may perform the functionality of device 140 (FIG. 1).

In some demonstrative embodiments, the initiating station 802 may receive TOA and TOD values in FTM messages from the responder STA 840, for example during a sequence of a plurality of bursts, e.g., during a first burst 810 and a second burst 820, e.g., subsequent to burst 810.

In some demonstrative embodiments, the estimating and correction interval may extend, for example, beyond a single burst, which may suggest longer intervals, and hence larger drifts.

In some demonstrative embodiments, the initiating station 802 may determine a correction to a local TSF of the initiator STA 802, for example, based on the timing of FTM messages from the responder station 840 during first burst 810 and second burst 820, e.g., as described below. For example, FTM component 117 (FIG. 1) may determine a correction to TSF 126 (FIG. 1), e.g., based on the timing of FTM messages from the device 140 (FIG. 1) during the first and second bursts, e.g., as described below.

In some demonstrative embodiments, as shown in FIG. 8, the initiating STA 802 may register a first TSF value, denoted TSF1, of a local TSF of the initiating STA 802, e.g., at an arrival of a first FTM message 832, denoted FTM_1, from the responding STA 840 during the first burst period 810. For example, FTM component 117 (FIG. 1) may register the first TSF value of TSF 126 (FIG. 1), e.g., at an arrival of the first FTM message 832 from device 140 (FIG. 1), e.g., as described above.

In some demonstrative embodiments, as shown in FIG. 8, a second FTM message 834, denoted FTM_2, from the responding STA 840 may include a first TOD value, denoted AP TOD_1, of the FTM message 832, e.g., as measured at the responding STA 840.

In some demonstrative embodiments, as shown in FIG. 8, the initiating STA 802 may register a second TSF value, denoted TSF2, of the local TSF of the initiating STA 802, e.g., at an arrival of the second FTM message 834 from the responding STA 840, e.g., during the first burst period 810. For example, FTM component 117 (FIG. 1) may register a second TSF value of TSF 126 (FIG. 1), e.g., at an arrival of the second FTM message 834 from device 140 (FIG. 1), e.g., during the first burst period.

In some demonstrative embodiments, as shown in FIG. 8, a third message 836, denoted FTM_3, from the responding STA 840 during the second burst period 820 may include a second TOD value, denoted AP TOD_2, of the FTM message 834, e.g., as measured at the responding STA 840.

In some demonstrative embodiments, as shown in FIG. 8, the initiating STA 802 may register a third TSF value, denoted TSF3, of the local TSF of the initiating STA 802, e.g., at an arrival of the third FTM message 836, from the responding STA 840. For example, FTM component 117 (FIG. 1) may register the third TSF value of TSF 126 (FIG. 1), e.g., at an arrival of the third FTM message 836 from device 140 (FIG. 1).

In some demonstrative embodiments, the third TSF value may be used, for example, for a subsequent TSF correction.

In some demonstrative embodiments, as shown in FIG. 8, the initiating STA 802 may determine a correction to be applied to the local TSF, denoted TSF Correction, e.g., to adjust and/or synchronize the local TSF of the initiating STA 802 to a TSF of the responding STA 840.

In some demonstrative embodiments, as shown in FIG. 8, the initiating STA 802 may determine the TSF correction, for example, based on the TSF values of the local TSF and the TOD values received in the FTM messages, e.g., using Equation 3.

In some demonstrative embodiments, as shown in FIG. 8, the initiating STA 802 may correct the local TSF, for example, using Equation 3. For example, FTM component 117 (FIG. 1) may correct TSF 126 (FIG. 1), for example, using Equation 4.

Figure 9:
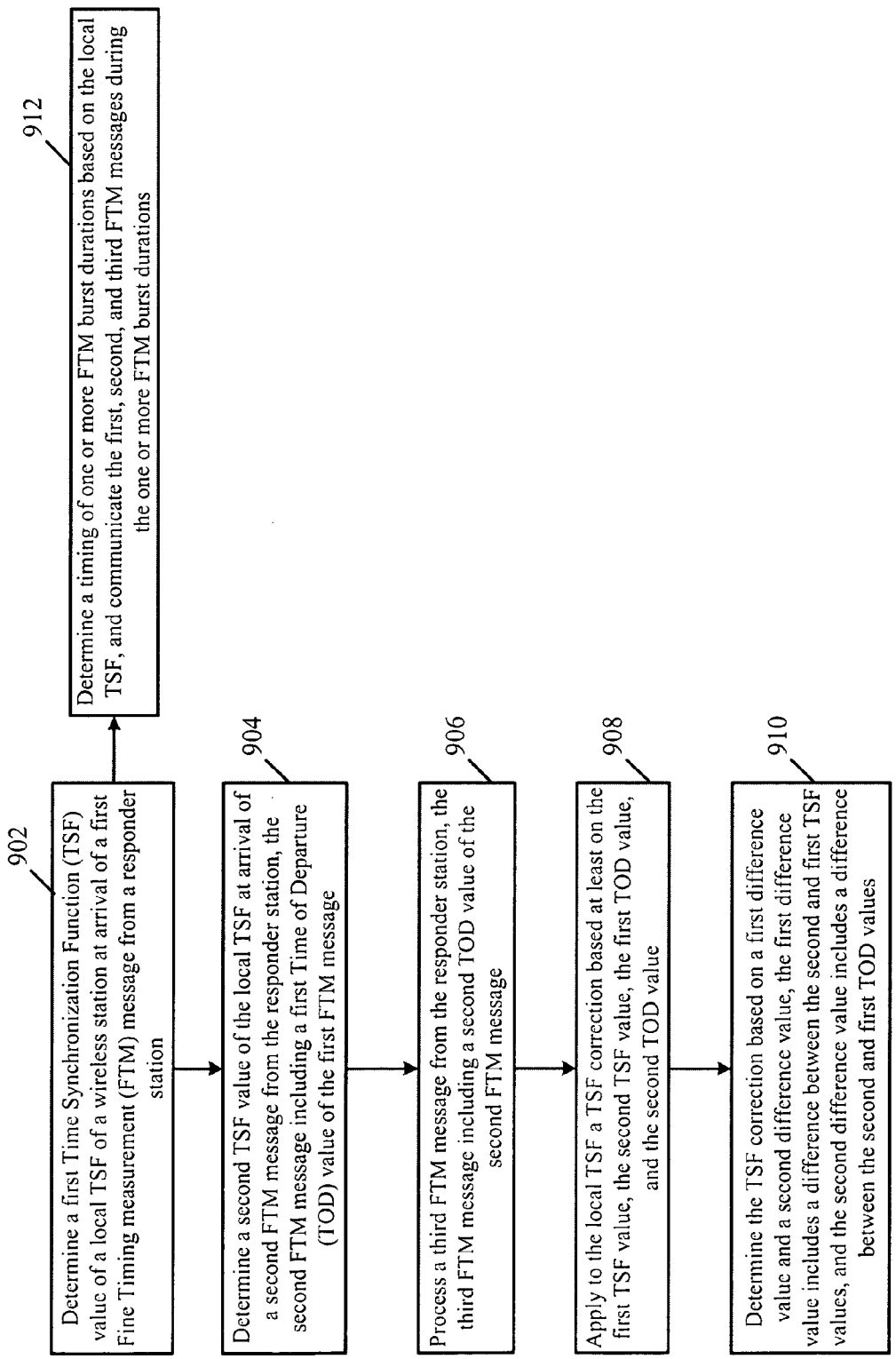
FIG. 9 is a schematic flow-chart illustration of a method of determining a Time Synchronization Function (TSF) based on Fine Timing Measurement (FTM) messages, in accordance with some demonstrative embodiments.

Reference is made to FIG. 9, which schematically illustrates a method of determining a Time Synchronization Function (TSF) based on Fine Timing Measurement (FTM) messages, in accordance with some demonstrative embodiments. For example, one or more of the operations of the method of FIG. 9 may be performed by a wireless communication system, e.g., system 100 (FIG. 1); a wireless communication device, e.g., devices 102 and/or 140 (FIG. 1); a controller, e.g., controllers 124 and/or 154 (FIG. 1); an FTM component, e.g., FTM component 117 (FIG. 1); a location estimator, e.g., location estimator 115 (FIG. 1); a radio, e.g., radios 114 and/or 144 (FIG. 1); a message processor, e.g., message processor 128 (FIG. 1) and/or message processor 158 (FIG. 1), a transmitter, e.g., transmitters 118 and/or 148 (FIG. 1); and/or a receiver, e.g., receivers 116 and/or 146 (FIG. 1).

As indicated at block 902, the method may include determining a first Time Synchronization Function (TSF) value of a local TSF of a wireless station at arrival of a first Fine Timing measurement (FTM) message from a responder station. For example, FTM component 117 (FIG. 1) may determine the first TSF value of TSF 126 (FIG. 1), for example, at arrival of the first FTM message from device 140 (FIG. 1), e.g., as described above.

As indicated at block 904, the method may include determining a second TSF value of the local TSF of the wireless station at arrival of a second Fine Timing measurement (FTM) message from the responder station, the second FTM message including a first Time of Departure (TOD) value of the first FTM message. For example, FTM component 117 (FIG. 1) may determine the second TSF value of TSF 126 (FIG. 1), for example, at arrival of the second FTM message from device 140 (FIG. 1), and the second FTM message may include a first TOD value of the first FTM message, e.g., as described above.

As indicated at block 906, the method may include processing a third FTM message from the responder station, the third FTM message including a second TOD value of the second FTM message. For example, FTM component 117 (FIG. 1) may process the third FTM message from device 140 (FIG. 1), the third FTM message may include the second TOD value of the second FTM message, e.g., as described above.

As indicated at block 908, the method may include applying to the local TSF a TSF correction based at least on the first TSF value, the second TSF value, the first TOD value, and the second TOD value. For example, FTM component 117 (FIG. 1) may apply to TSF 126 (FIG. 1) the TSF correction based at least on the first TSF value, the second TSF value, the first TOD value, and the second TOD value, for example, according to Equation 3, e.g., as described above.

As indicated at block 910, the method may include determining the TSF correction based on a first difference value and a second difference value, the first difference value includes a difference between the second and first TSF values, and the second difference value includes a difference between the second and first TOD values. For example, FTM component 117 (FIG. 1) may determine the TSF correction based on the first difference value and the second difference value, for example, according to Equation 4, e.g., as described above.

As indicated at block 912, the method may include determining timing of at least one FTM burst duration based on the local TSF, and communicating the first, second, and third FTM messages during the at least one FTM burst period. For example, FTM component 117 (FIG. 1) may determine timing of one or more FTM burst periods based TSF 126 (FIG. 1), and FTM component 117 (FIG. 1) may cause, trigger and/or control device 102 (FIG. 1) to communicate the first, second, and third FTM messages during the one or more FTM burst periods, as described above.

Figure 10:
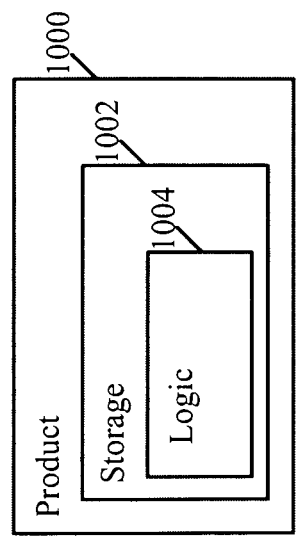
FIG. 10 is a schematic illustration of a product, in accordance with some demonstrative embodiments.

Reference is made to FIG. 10, which schematically illustrates a product of manufacture 1000, in accordance with some demonstrative embodiments. Product 1000 may include a non-transitory machine-readable storage medium 1002 to store logic 1004, which may be used, for example, to perform at least part of the functionality of devices 102 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), FTM component 117 (FIG. 1), location estimator 115 (FIG. 1), and/or to perform one or more operations descried above with reference to FIGS. 2, 6, 7, 8 and/or 9, and/or one or more operations described herein. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a memory and a processor, the processor configured to cause a wireless station to determine a first Time Synchronization Function (TSF) value of a local TSF of the wireless station at arrival of a first Fine Timing measurement (FTM) message from a responder station; determine a second TSF value of the local TSF at arrival of a second FTM message from the responder station, the second FTM message comprising a first Time of Departure (TOD) value of the first FTM message; process a third FTM message from the responder station, the third FTM message comprising a second TOD value of the second FTM message; and apply to the local TSF a TSF correction based at least on the first TSF value, the second TSF value, the first TOD value, and the second TOD value.

Example 2 includes the subject matter of Example 1, and optionally, wherein the processor is configured to cause the wireless station to determine the TSF correction based on a first difference value and a second difference value, the first difference value comprising a difference between the second and first TSF values, and the second difference value comprises a difference between the second and first TOD values.

Example 3 includes the subject matter of Example 1 or 2, and optionally, wherein the processor is configured to cause the wireless station to determine a timing of an FTM burst period based on the local TSF, and to communicate the first, second, and third FTM messages during the FTM burst period.

Example 4 includes the subject matter of any one of Examples 1-3, and optionally, wherein the first and second FTM messages comprise messages within a single burst duration.

Example 5 includes the subject matter of any one of Examples 1-3, and optionally, wherein the first FTM message is within a first burst duration, and the second FTM message is within a second burst duration subsequent to the first burst duration.

Example 6 includes the subject matter of any one of Examples 1-5, and optionally, comprising a radio to receive the first, second, and third FTM messages.

Example 7 includes the subject matter of any one of Examples 1-6, and optionally, comprising one or more antennas.

Example 8 includes a system of wireless communication comprising one or more antennas; a radio; a memory; and a processor configured to cause a wireless station to determine a first Time Synchronization Function (TSF) value of a local TSF of the wireless station at arrival of a first Fine Timing measurement (FTM) message from a responder station; determine a second TSF value of the local TSF at arrival of a second FTM message from the responder station, the second FTM message comprising a first Time of Departure (TOD) value of the first FTM message; process a third FTM message from the responder station, the third FTM message comprising a second TOD value of the second FTM message; and apply to the local TSF a TSF correction based at least on the first TSF value, the second TSF value, the first TOD value, and the second TOD value.

Example 9 includes the subject matter of Example 8, and optionally, wherein the processor is configured to cause the wireless station to determine the TSF correction based on a first difference value and a second difference value, the first difference value comprising a difference between the second and first TSF values, and the second difference value comprises a difference between the second and first TOD values.

Example 10 includes the subject matter of Example 8 or 9, and optionally, wherein the processor is configured to cause the wireless station to determine a timing of an FTM burst period based on the local TSF, and to communicate the first, second, and third FTM messages during the FTM burst period.

Example 11 includes the subject matter of any one of Examples 8-10, and optionally, wherein the first and second FTM messages comprise messages within a single burst duration.

Example 12 includes the subject matter of any one of Examples 8-10, and optionally, wherein the first FTM message is within a first burst duration, and the second FTM message is within a second burst duration subsequent to the first burst duration.

Example 13 includes the subject matter of any one of Examples 8-12, and optionally, wherein the radio is configured to receive the first, second, and third FTM messages.

Example 14 includes a method to be performed at a wireless station, the method comprising determining a first Time Synchronization Function (TSF) value of a local TSF of the wireless station at arrival of a first Fine Timing measurement (FTM) message from a responder station; determining a second TSF value of the local TSF at arrival of a second FTM message from the responder station, the second FTM message comprising a first Time of Departure (TOD) value of the first FTM message; processing a third FTM message from the responder station, the third FTM message comprising a second TOD value of the second FTM message; and applying to the local TSF a TSF correction based at least on the first TSF value, the second TSF value, the first TOD value, and the second TOD value.

Example 15 includes the subject matter of Example 14, and optionally, comprising determining the TSF correction based on a first difference value and a second difference value, the first difference value comprising a difference between the second and first TSF values, and the second difference value comprises a difference between the second and first TOD values.

Example 16 includes the subject matter of Example 14 or 15, and optionally, comprising determining a timing of an FTM burst period based on the local TSF, and communicating the first, second, and third FTM messages during the FTM burst period.

Example 17 includes the subject matter of any one of Examples 14-16, and optionally, wherein the first and second FTM messages comprise messages within a single burst duration.

Example 18 includes the subject matter of any one of Examples 14-16, and optionally, wherein the first FTM message is within a first burst duration, and the second FTM message is within a second burst duration subsequent to the first burst duration.

Example 19 includes the subject matter of any one of Examples 14-18, and optionally, comprising receiving the first, second, and third FTM messages.

Example 20 includes a product comprising one or more tangible computer-readable non-transitory storage media comprising computer-executable instructions operable to, when executed by at least one computer processor, enable the at least one computer processor to implement one or more operations at a wireless station, the operations comprising determining a first Time Synchronization Function (TSF) value of a local TSF of the wireless station at arrival of a first Fine Timing measurement (FTM) message from a responder station; determining a second TSF value of the local TSF at arrival of a second FTM message from the responder station, the second FTM message comprising a first Time of Departure (TOD) value of the first FTM message; processing a third FTM message from the responder station, the third FTM message comprising a second TOD value of the second FTM message; and applying to the local TSF a TSF correction based at least on the first TSF value, the second TSF value, the first TOD value, and the second TOD value.

Example 21 includes the subject matter of Example 20, and optionally, wherein the operations comprise determining the TSF correction based on a first difference value and a second difference value, the first difference value comprising a difference between the second and first TSF values, and the second difference value comprises a difference between the second and first TOD values.

Example 22 includes the subject matter of Example 20 or 21, and optionally, wherein the operations comprise determining a timing of an FTM burst period based on the local TSF, and communicating the first, second, and third FTM messages during the FTM burst period.

Example 23 includes the subject matter of any one of Examples 20-22, and optionally, wherein the first and second FTM messages comprise messages within a single burst duration.

Example 24 includes the subject matter of any one of Examples 20-22, and optionally, wherein the first FTM message is within a first burst duration, and the second FTM message is within a second burst duration subsequent to the first burst duration.

Example 25 includes the subject matter of any one of Examples 20-24, and optionally, wherein the operations comprise receiving the first, second, and third FTM messages.

Example 26 includes an apparatus of a wireless station, the apparatus comprising means for determining a first Time Synchronization Function (TSF) value of a local TSF of the wireless station at arrival of a first Fine Timing measurement (FTM) message from a responder station; means for determining a second TSF value of the local TSF at arrival of a second FTM message from the responder station, the second FTM message comprising a first Time of Departure (TOD) value of the first FTM message; means for processing a third FTM message from the responder station, the third FTM message comprising a second TOD value of the second FTM message; and means for applying to the local TSF a TSF correction based at least on the first TSF value, the second TSF value, the first TOD value, and the second TOD value.

Example 27 includes the subject matter of Example 26, and optionally, comprising means for determining the TSF correction based on a first difference value and a second difference value, the first difference value comprising a difference between the second and first TSF values, and the second difference value comprises a difference between the second and first TOD values.

Example 28 includes the subject matter of Example 26 or 27, and optionally, comprising means for determining a timing of an FTM burst period based on the local TSF, and communicating the first, second, and third FTM messages during the FTM burst period.

Example 29 includes the subject matter of any one of Examples 26-28, and optionally, wherein the first and second FTM messages comprise messages within a single burst duration.

Example 30 includes the subject matter of any one of Examples 26-28, and optionally, wherein the first FTM message is within a first burst duration, and the second FTM message is within a second burst duration subsequent to the first burst duration.

Example 31 includes the subject matter of any one of Examples 26-30, and optionally, comprising means for receiving the first, second, and third FTM messages.

Functions, operations, components and/or features described herein with reference to one or more embodiments, may be combined with, or may be utilized in combination with, one or more other functions, operations, components and/or features described herein with reference to one or more other embodiments, or vice versa.

While certain features of have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a memory and a processor, the processor configured to cause a wireless station to:
   determine a first Time Synchronization Function (TSF) value of a local TSF of said wireless station at arrival of a first Fine Timing measurement (FTM) message from a responder station;
   determine a second TSF value of the local TSF at arrival of a second FTM message from the responder station, the second FTM message comprising a first Time of Departure (TOD) value of the first FTM message;
   process a third FTM message from the responder station, the third FTM message comprising a second TOD value of the second FTM message; and
   apply to the local TSF a TSF correction based at least on the first TSF value, the second TSF value, the first TOD value, and the second TOD value, the TSF correction based on a first difference value and a second difference value, the first difference value comprising a difference between the second and first TSF values, the second difference value comprises a difference between the second and first TOD values.

2. The apparatus of claim 1, wherein the processor is configured to cause the wireless station to determine a timing of an FTM burst period based on said local TSF, and to communicate the first, second, and third FTM messages during the FTM burst period.

3. The apparatus of claim 1, wherein the first and second FTM messages comprise messages within a single burst duration.

4. The apparatus of claim 1, wherein the first FTM message is within a first burst duration, and the second FTM message is within a second burst duration subsequent to the first burst duration.

5. The apparatus of claim 1 comprising a radio to receive the first, second, and third FTM messages.

6. The apparatus of claim 1 comprising one or more antennas.

7. A system of wireless communication comprising:
one or more antennas;
a radio;
a memory; and
a processor configured to cause a wireless station to:
determine a first Time Synchronization Function (TSF) value of a local TSF of said wireless station at arrival of a first Fine Timing measurement (FTM) message from a responder station;
determine a second TSF value of the local TSF at arrival of a second FTM message from the responder station, the second FTM message comprising a first Time of Departure (TOD) value of the first FTM message;
process a third FTM message from the responder station, the third FTM message comprising a second TOD value of the second FTM message; and
apply to the local TSF a TSF correction based at least on the first TSF value, the second TSF value, the first TOD value, and the second TOD value, the TSF correction based on a first difference value and a second difference value, the first difference value comprising a difference between the second and first TSF values, the second difference value comprises a difference between the second and first TOD values.

8. The system of claim 7, wherein the processor is configured to cause the wireless station to determine a timing of an FTM burst period based on said local TSF, and to communicate the first, second, and third FTM messages during the FTM burst period.

9. The system of claim 7, wherein the first and second FTM messages comprise messages within a single burst duration.

10. The system of claim 7, wherein the first FTM message is within a first burst duration, and the second FTM message is within a second burst duration subsequent to the first burst duration.

11. The system of claim 7, wherein said radio is configured to receive the first, second, and third FTM messages.

12. A method to be performed at a wireless station, the method comprising:
determining a first Time Synchronization Function (TSF) value of a local TSF of said wireless station at arrival of a first Fine Timing measurement (FTM) message from a responder station;
determining a second TSF value of the local TSF at arrival of a second FTM message from the responder station, the second FTM message comprising a first Time of Departure (TOD) value of the first FTM message;
processing a third FTM message from the responder station, the third FTM message comprising a second TOD value of the second FTM message; and
applying to the local TSF a TSF correction based at least on the first TSF value, the second TSF value, the first TOD value, and the second TOD value, the TSF correction based on a first difference value and a second difference value, the first difference value comprising a difference between the second and first TSF values, the second difference value comprises a difference between the second and first TOD values.

13. The method of claim 12 comprising determining a timing of an FTM burst period based on said local TSF, and communicating the first, second, and third FTM messages during the FTM burst period.

14. The method of claim 12, wherein the first and second FTM messages comprise messages within a single burst duration.

15. The method of claim 12, wherein the first FTM message is within a first burst duration, and the second FTM message is within a second burst duration subsequent to the first burst duration.

16. The method of claim 12 comprising receiving the first, second, and third FTM messages.

17. A product comprising one or more tangible computer-readable non-transitory storage media comprising computer-executable instructions operable to, when executed by at least one computer processor, enable the at least one computer processor to cause a wireless station to:
determine a first Time Synchronization Function (TSF) value of a local TSF of said wireless station at arrival of a first Fine Timing measurement (FTM) message from a responder station;
determine a second TSF value of the local TSF at arrival of a second FTM message from the responder station, the second FTM message comprising a first Time of Departure (TOD) value of the first FTM message;
process a third FTM message from the responder station, the third FTM message comprising a second TOD value of the second FTM message; and
apply to the local TSF a TSF correction based at least on the first TSF value, the second TSF value, the first TOD value, and the second TOD value, the TSF correction based on a first difference value and a second difference value, the first difference value comprising a difference between the second and first TSF values, the second difference value comprises a difference between the second and first TOD values.

18. The product of claim 17, wherein the instructions, when executed, cause the wireless station to determine a timing of an FTM burst period based on said local TSF, and communicate the first, second, and third FTM messages during the FTM burst period.

19. The product of claim 17, wherein the first and second FTM messages comprise messages within a single burst duration.

20. The product of claim 17, wherein the first FTM message is within a first burst duration, and the second FTM message is within a second burst duration subsequent to the first burst duration.

21. The product of claim 17, wherein the instructions, when executed, cause the wireless station to receive the first, second, and third FTM messages.

* * * * *